United States Patent
Kuromatsu et al.

(10) Patent No.: US 10,810,025 B2
(45) Date of Patent: Oct. 20, 2020

(54) OPERATION CONTROL METHOD, AND APPARATUS FOR OPERATION CONTROL, AND NON-TRANSITORY COMPUTER-READABLE STORAGE MEDIUM FOR STORING PROGRAM

(71) Applicant: FUJITSU LIMITED, Kawasaki-shi, Kanagawa (JP)

(72) Inventors: Nobuyuki Kuromatsu, Kawasaki (JP); Haruyasu Ueda, Ichikawa (JP)

(73) Assignee: FUJITSU LIMITED, Kawasaki (JP)

( * ) Notice: Subject to any disclaimer, the term of this patent is extended or adjusted under 35 U.S.C. 154(b) by 88 days.

(21) Appl. No.: 16/278,835

(22) Filed: Feb. 19, 2019

(65) Prior Publication Data

US 2019/0286463 A1    Sep. 19, 2019

(30) Foreign Application Priority Data

Mar. 13, 2018 (JP) ................ 2018-045891

(51) Int. Cl.
*G06F 9/455* (2018.01)
*G06F 9/445* (2018.01)
*G06F 8/61* (2018.01)

(52) U.S. Cl.
CPC ........... *G06F 9/455* (2013.01); *G06F 8/61* (2013.01); *G06F 9/44505* (2013.01); *G06F 9/45558* (2013.01); *G06F 2009/45562* (2013.01)

(58) Field of Classification Search
CPC .................................................. G06F 9/455
See application file for complete search history.

(56) References Cited

U.S. PATENT DOCUMENTS

| 2006/0029054 | A1 | 2/2006 | Breh et al. | |
| 2010/0299309 | A1* | 11/2010 | Maki | G06F 11/1479 707/640 |
| 2011/0154332 | A1* | 6/2011 | Shirae | G06F 9/45558 718/1 |
| 2017/0168778 | A1 | 6/2017 | Brandys et al. | |

FOREIGN PATENT DOCUMENTS

| JP | 2007-538313 | 12/2007 |
| JP | 2016-130887 | 7/2016 |
| JP | 2017-107555 | 6/2017 |
| WO | 2005/106666 | 11/2005 |

* cited by examiner

*Primary Examiner* — Charlie Sun
(74) *Attorney, Agent, or Firm* — Fujitsu Patent Center

(57) ABSTRACT

An operation control method includes: storing data used by an application according to a first definition with respect to an interface of data operation when defining a way of starting a container, the container representing a region in which an execution environment of the application is disposed; storing an image file for the execution environment of the application; and registering a second definition into definition information, the second definition indicating the way of starting the container and being obtained by adding data information to information regarding the image file for the execution environment of the application in accordance with a third definition with respect to an interface of container operation, the data information being information regarding data used by the application in the container.

15 Claims, 14 Drawing Sheets

FIG. 3

EXAMPLE OF CATALOG INFORMATION

```
/catalog_date
   ┌ CATALOG ID  CONTAINER STARTING DEFINITION
   ├ 001/  container1.yml
   │       container2.yml
   ├ 002/  container1.yml
   └ 003/  container1.yml
```

22

```
docker_image: 'kuromt/app1:v1'
ports: {'ssh-port': 22, 'webapi_port': 80}
envs: {'MY_PASSWORD': hogehoge}
asset:
   datadir: {'mountdir': '/train', 'path': 'dataset'}
   modeldir: {'mountdir': '/model', 'path': 'model'}
```

FIG. 4

| catalog _id | catalog _version | docker _image | port | | Envs | asset | | | |
|---|---|---|---|---|---|---|---|---|---|
| | | | | | | datadir | | modeldir | |
| | | | | | | mountdir | path | mountdir | path |
| 1 | v1 | kuromt/ app1:v1 | ssh- port:22 | webapi_port :80 | MY_PASSWORD: hogehoge | /train | dataset | /model | model |
| 2 | v2 | kuromt/ app1:v2 | | | | | | | |
| 3 | dev | ueda/ jj:dev | | | | | | | |

22

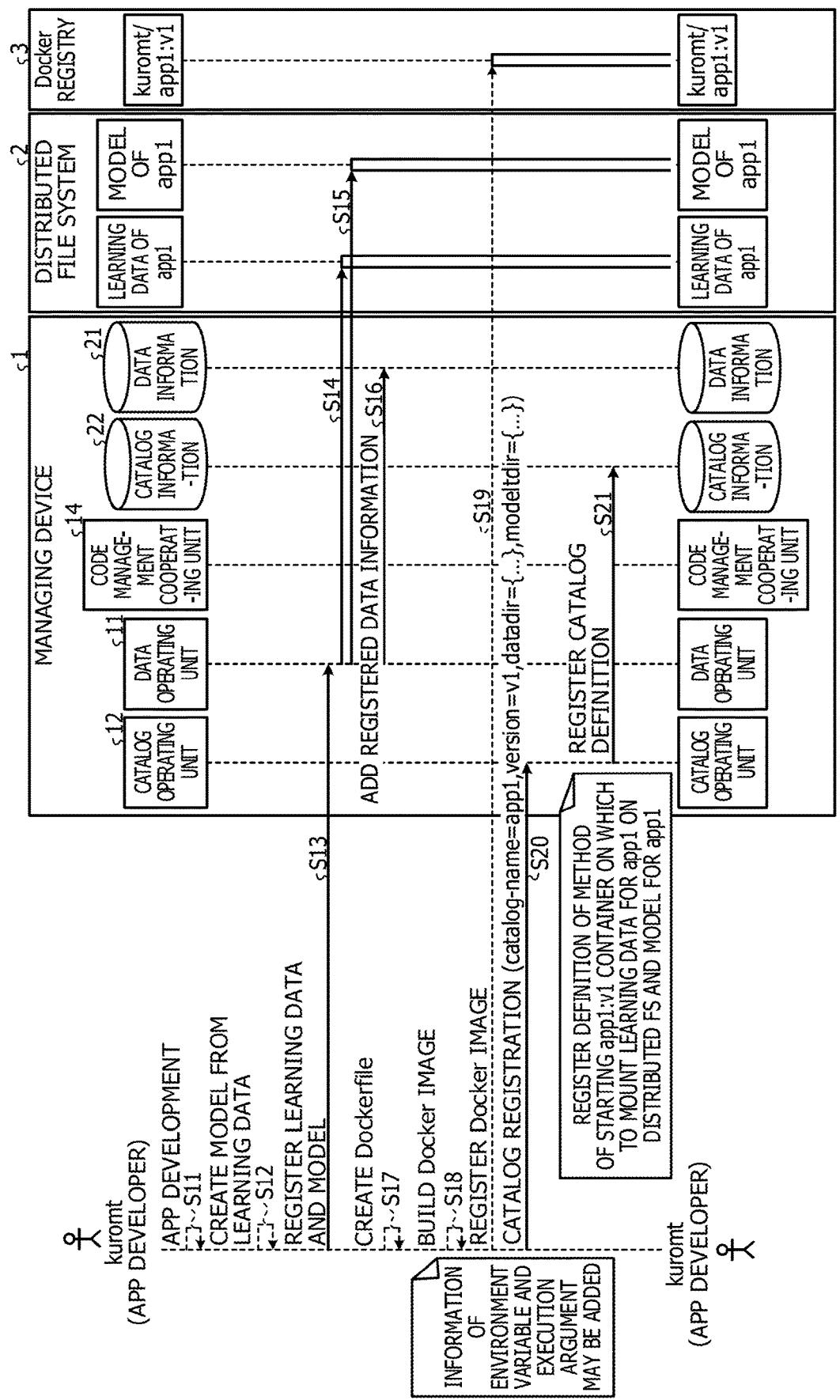

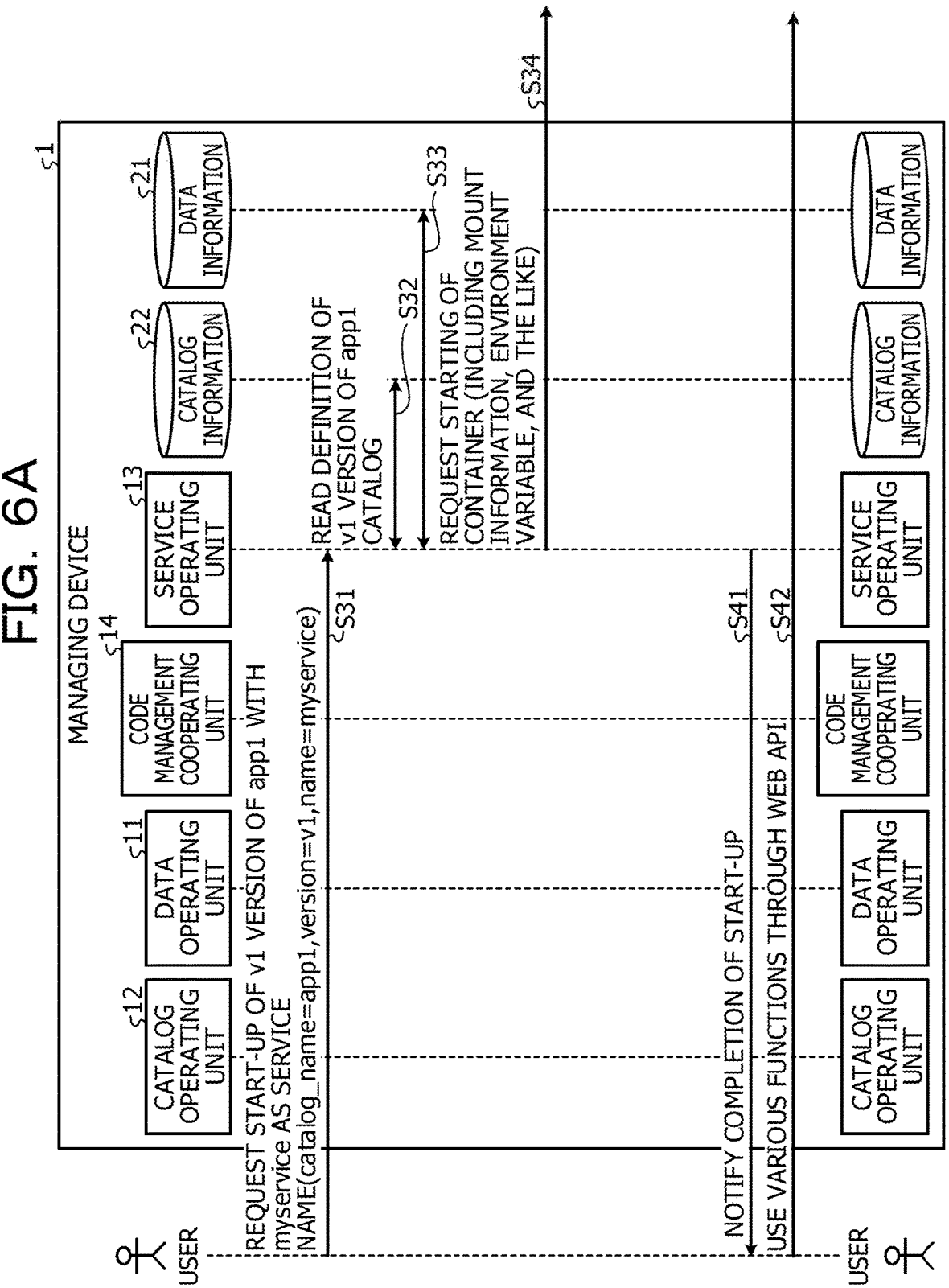

OPERATION CONTROL METHOD, AND APPARATUS FOR OPERATION CONTROL, AND NON-TRANSITORY COMPUTER-READABLE STORAGE MEDIUM FOR STORING PROGRAM

CROSS-REFERENCE TO RELATED APPLICATION

This application is based upon and claims the benefit of priority of the prior Japanese Patent Application No. 2018-45891, filed on Mar. 13, 2018, the entire contents of which are incorporated herein by reference.

FIELD

The embodiments discussed herein are related to an operation control method, an apparatus for operation control, and a non-transitory computer-readable storage medium for storing a program.

BACKGROUND

In recent years, a technology of virtual machine (VM) virtualization and a technology of container-based virtualization have been known as technologies for reproducing a developed application in an arbitrary environment. VM virtualization reproduces a particular environment by starting a VM on a host. Container-based virtualization reproduces a particular environment by providing a virtual user space referred to as a container on a kernel of an operating system (OS) on a host.

The VM necessitates introduction of virtualization software for operating another OS on the host. On the one hand, container-based virtualization is the same as the VM in that a particular environment is reproduced, but uses the kernel of the OS on the host as it is. Thus, container-based virtualization does not need virtualization software, and features a quick start and a small overhead. Docker (registered trademark), for example, is cited as a project of container-based virtualization.

Here, an example of usage of Docker will be described with reference to FIG. 10. FIG. 10 is a reference diagram illustrating an example of usage of Docker. As illustrated in FIG. 10, in order to enable an application to be executed as a container of Docker, an application developer prepares a Dockerfile defining an execution environment and the source code of the application (a1 and a2). The Dockerfile in this case refers to a file defining the execution environment of the application.

The application developer builds a Docker image by using the Dockerfile and the source code of the application (a3). In this case, the application developer builds the Docker image in a case where an OS is Ubuntu. A user using this application obtains the Docker image in the case where the OS is Ubuntu in an executing machine, and starts a container. In this case, the Docker image "hoge/app1:v1" of the application "app1" created by "hoge" as the application developer is built. Incidentally, v1 is a Docker tag to be described later. v1, for example, denotes a version as Ubuntu.

When the user uses this application, the user obtains (pulls) the Docker image into the executing machine (a4), and starts a container (a5). The container reproduces an environment in which the application operates as it is, including a library being used and the OS. Hence, the user does not need to be aware of the OS and a tool needed by the application operating on the container.

In addition, there may be a case where the development of the application already converted into the Docker image progresses, and the image of the application improved from the past is used, or there may be a case where a different image is used according to a purpose. In such a case, a name for identifying the Docker image may be attached, the name being referred to as a Docker tag as described earlier. Suppose, for example, that there is a Docker image having a name of "apache_server." In a case where a version as CentOs and a version as Ubuntu are distinguished from each other in the OS, tags may be added as in "apache_server:centos" and "apatche_server:ubuntu," respectively.

Examples of the related art include Japanese Laid-open Patent Publication No. 2016-130887, Japanese National Publication of International Patent Application No. 2007-538313, and Japanese Laid-open Patent Publication No. 2017-107555.

SUMMARY

According to an aspect of the embodiments, an operation control method includes: storing data used by an application according to a first definition with respect to an interface of data operation when defining a way of starting a container, the container representing a region in which an execution environment of the application is disposed; storing an image file for the execution environment of the application; and registering a second definition into definition information, the second definition indicating the way of starting the container and being obtained by adding data information to information regarding the image file for the execution environment of the application in accordance with a third definition with respect to an interface of container operation, the data information being information regarding data used by the application in the container.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 3 is a diagram illustrating an example of a format of catalog information according to the embodiment;

FIG. 4 is a diagram illustrating another example of the format of the catalog information according to the embodiment;

FIG. 5 is a diagram illustrating an example of a sequence of a catalog operation according to the embodiment;

FIGS. 6A and 6B are a diagram illustrating an example of a sequence of starting a service according to the embodiment;

DESCRIPTION OF EMBODIMENTS

However, there are problems in operating an application using large-scale data on a container.

A first problem is that when large-scale data is embedded in the Docker image, it takes time to obtain the image and start the container, and an advantage of Docker itself in that the container is started quickly is lost. Incidentally, there is a limitation in that data up to 10 gigabytes (GB) can be embedded in a container. There is thus a problem in that the embedding of large-scale data in the Docker image is itself difficult. Learning data and learning models of machine learning, for example, tend to be large-scale data. Such a problem may therefore occur.

Such problems may be solved by the mounting of an external storage by the container. For example, in a case where data is learning data, the problems may be solved when Docker mounts data such as the learning data and a learning model stored in an external storage when starting the container, instead of embedding these pieces of data in the container.

However, a method of storing the data in the external storage involves managing the Docker image and also data accompanying the image. Hence, there is a second problem in that a user needs to grasp a combination of the Docker image and the data at a time of starting the container and the management of the combination is complicated. In the case where the data is learning data, for example, the data to be mounted ranges widely, including data used for learning, a generated learning model, data used at a time of relearning, a learning model generated based on a result of the relearning, and the like. When the application is improved, combinations of the Docker image and the data are increased by the number of versions. In addition, the user needs to grasp which path of a data storage location stores the learning data and the learning model and which data to mount. Hence, the user needs to grasp the combination of the Docker image and the data at a time of starting the container, and the management of the combination is complicated.

Incidentally, the above-described problems occur in Docker and also similarly occur in container-based virtualization technologies such as rkt and LXC.

In one aspect, it is an object to allow a user to use an application on a container even when the user does not grasp a combination of a storage location of data to be used and an image of the execution environment of the application to be used.

Embodiments of an operation control method, an information processing device, and an operation control program disclosed in the present application will hereinafter be described in detail with reference to the drawings. Incidentally, in the embodiments, description will be made of a case where Docker is applied as a project of container-based virtualization. The present technology is not limited by the embodiments.

Embodiments

[Example of Processing of System Including Managing Device]

Figure 1A:
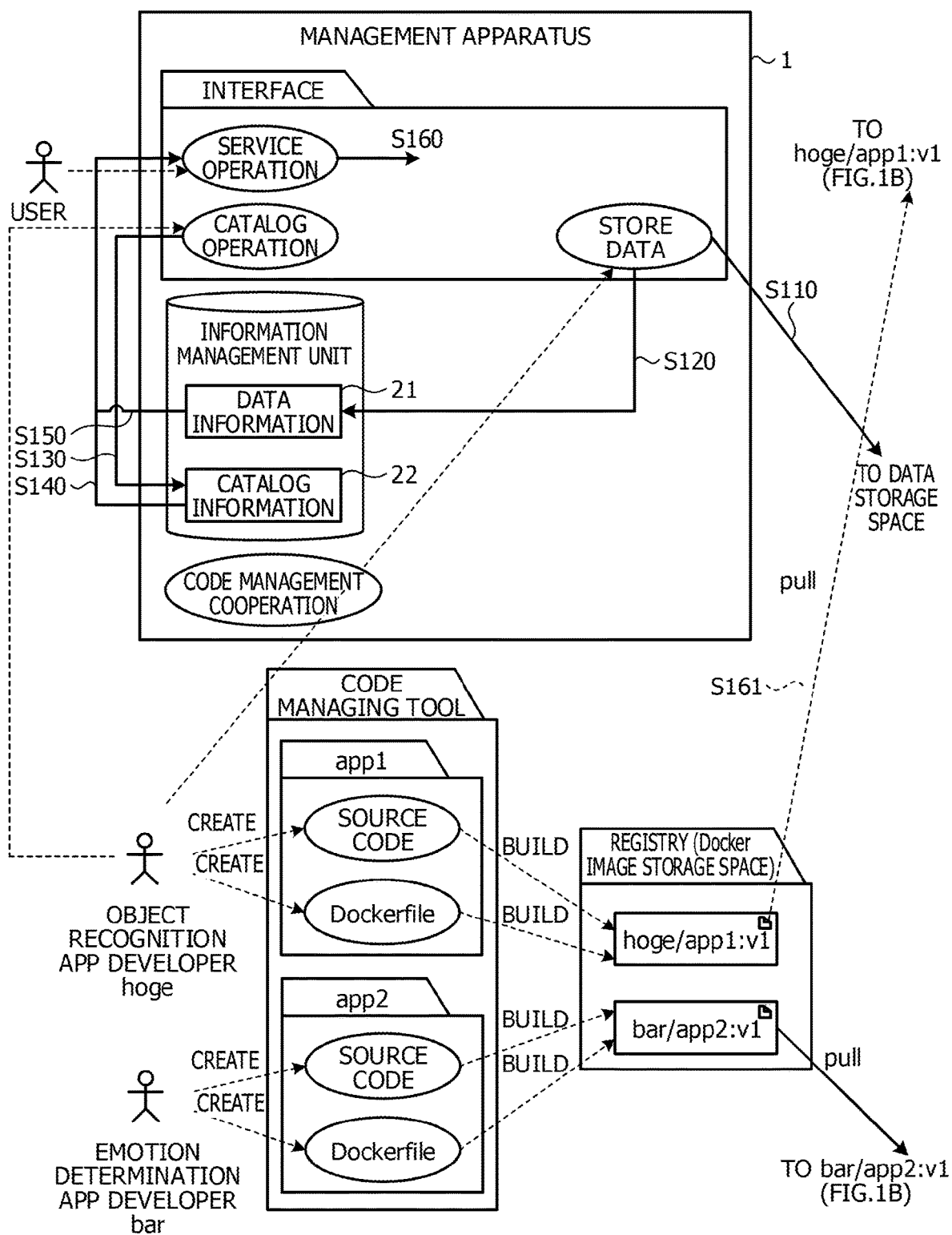
FIGS. 1A and 1B are a diagram illustrating an example of processing of a system including a managing device according to an embodiment.
Figure 1B:
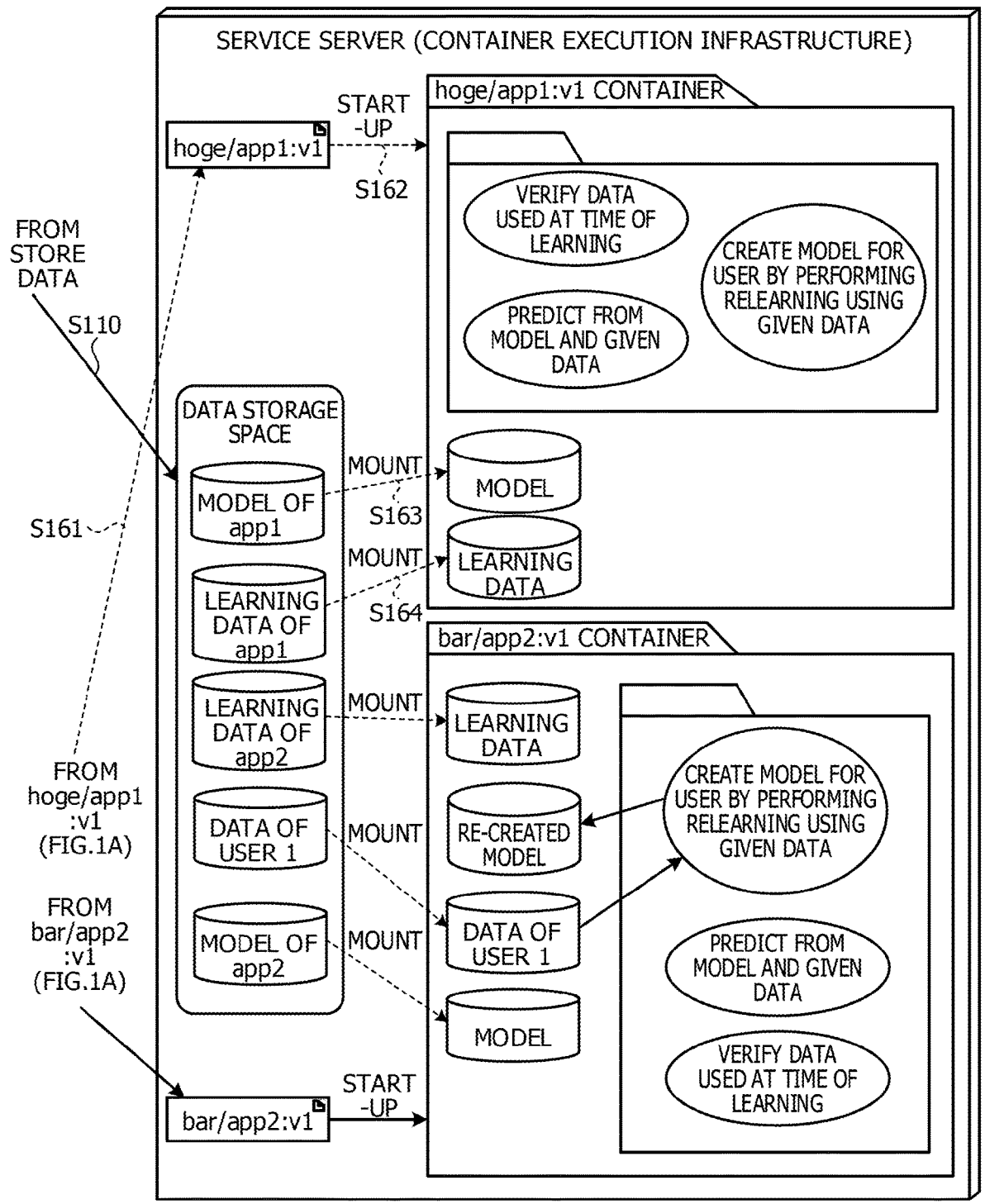

FIG. 1 (i.e., FIGS. 1A and 1B) is a diagram illustrating an example of processing of a system including a managing device according to an embodiment. As illustrated in FIG. 1, a managing device 1 includes, as interfaces, a catalog operation, a service operation, and a data storage operation. The interface of the catalog operation is used to register a definition of a method of starting a container that is to operate on a container execution infrastructure (service server). Incidentally, the definition of the method of starting the container will be referred to as a "catalog." In addition, the interface of the service operation is used to perform a service of starting the container. The interface of the service operation may be a service having a function of a Web application programming interface (API). In addition, the interface of the data storage operation is used to store data used by the container execution infrastructure (service server).

In order to make an application executable as a Docker container, an application developer prepares a Dockerfile defining an execution environment and the source code of the application in advance, and builds a Docker image using the Dockerfile and the source code. The application developer then registers the built Docker image in a registry (storage space of the Docker image). Incidentally, the build of the Docker image and the registration of the Docker image in the registry may be performed by a code managing tool. Incidentally, the code managing tool will be described later.

Under such conditions, the application developer stores specified data in a data storage space according to the interface of the data storage operation used by the application (S110). The data storage space may be present in the container execution infrastructure (service server), or may be present in a separate distributed file system. The data is, for example, a learning model for machine learning and learning data for machine learning. The interface of the data storage operation then registers a concrete data path of the data storage space in data information 21 (S120).

The application developer registers a catalog in catalog information 22 according to the interface of the catalog operation (S130). The catalog includes the name of the Docker image, ports used in communication, an environment variable, a kind of the data, a data path, and a mount path within the container. The catalog is identified by a catalog name and a version.

When the user desires to use a certain service, the user specifies a catalog name and a version, and calls the interface of the service operation. The interface of the service operation refers to the catalog information 22, and obtains a catalog corresponding to the specified catalog name and the specified version (S140). In addition, the interface of the service operation refers to the data information 21, and obtains a concrete data path of the data storage space, the concrete data path corresponding to a data path set in the catalog (S150). The interface of the service operation then requests the container execution infrastructure (service server) to start a container (S160). A request to start the container includes the name of a Docker image included in the catalog, ports, an environment variable, the data path, a mount path within the container, and the concrete data path of the data storage space.

Then, receiving the request to start the container, Docker of the service server obtains (pulls) the Docker image corresponding to the name of the Docker image from the registry (S161). Docker then starts the container by using the obtained Docker image (S162). Docker then obtains data corresponding to the concrete data path of the data storage space from the data storage space, and mounts the obtained data in the mount path within the container (S163 and S164).

In a case where the user specifies "app1" as a catalog name and "v1" as a version, for example, the interface of the service operation refers to the catalog information, and obtains a catalog corresponding to the specified catalog name "app1" and the specified version "v1." Suppose that the catalog includes "hoge/app1:v1" as the name of the Docker image, ports used in communication, and an environment variable. In addition, suppose that the catalog includes a data path and a mount path within the container in a case where a kind of data is a learning model. In addition, suppose that the catalog includes a data path and a mount path within the container in a case where a kind of data is learning data The interface of the service operation then refers to the data information 21, and obtains a concrete data path of the data storage space, the concrete data path corresponding to the specified catalog name "app1" and the specified version "v1." The interface of the service operation then requests the container execution infrastructure (service server) to start the container. A request to start the container includes the name "hoge/app1:v1" of the Docker image included in the catalog, the ports, the environment variable, the data paths, the mount paths within the container, and concrete data paths of the data storage space.

Then, Docker of the service server receiving the request to start the container obtains (pulls) the Docker image corresponding to the name "hoge/app1:v1" of the Docker image from the registry. Docker then starts the container by using the obtained Docker image. Docker then obtains the data "learning model of app1" corresponding to the concrete data path of the data storage space from the data storage space, and mounts the obtained data in the mount path within the container (S163). Docker obtains the data "learning data of app1" corresponding to the concrete data path of the data storage space from the data storage space, and mounts the obtained data in the mount path within the container (S164).

The application developer thus registers the definition (catalog) of the method of starting the container according to the definition of the interface of the catalog operation. As a result, the user can use the application on the container by merely specifying the name and version of the catalog without being aware of the combination of the data storage locations and the Docker image to be used.

[Configuration of Managing Device]

Figure 2:
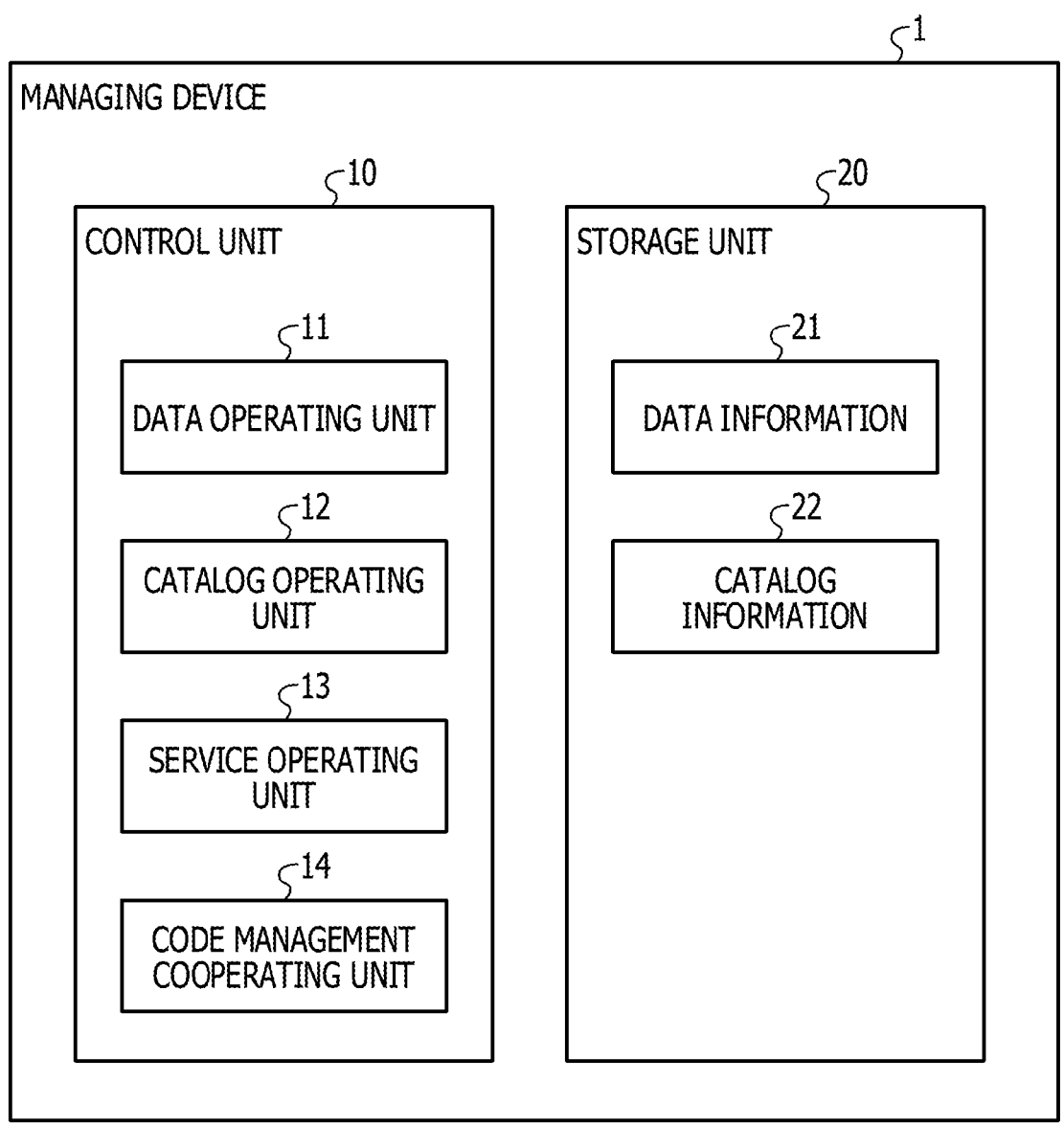
FIG. 2 is a functional block diagram illustrating a configuration of a managing device according to the embodiment.

FIG. 2 is a functional block diagram illustrating a configuration of a managing device according to the embodiment. As illustrated in FIG. 2, the managing device 1 includes a control unit 10 and a storage unit 20.

The control unit 10 corresponds to an electronic circuit such as a central processing unit (CPU). The control unit 10 includes an internal memory for storing a program defining various processing procedures and control data. The control unit 10 performs various kinds of processing according to the program and the control data. The control unit 10 includes a data operating unit 11, a catalog operating unit 12, a service operating unit 13, and a code management cooperating unit 14. Incidentally, the data operating unit 11 is an example of a first operating unit. The service operating unit 13 is an example of a second operating unit.

The storage unit 20 is a semiconductor memory element such as a random access memory (RAM) or a flash memory, or a storage device such as a hard disk or an optical disk. The storage unit 20 includes the data information 21 and the catalog information 22.

The data information 21 is information regarding an actual storage space of data defined in a catalog. For example, the data information 21 is information associating the catalog and a version with a data path in which the data is actually stored. Incidentally, the data information 21 is generated by the data operating unit 11 to be described later.

The catalog information 22 is a set of a plurality of catalogs. A catalog is information defining a method of starting a container. Incidentally, the catalog information 22 is generated by the catalog operating unit 12.

An example of a format of the catalog information 22 will be described in the following with reference to FIG. 3. FIG. 3 is a diagram illustrating an example of a format of catalog information according to the embodiment. As illustrated in FIG. 3, the catalog information 22 is stored under an arbitrary path (/catalog_date in FIG. 3) of a file system of the managing device 1. Under the arbitrary path, a directory is divided for each catalog ID (IDentifier). Then, a container starting definition is stored under each divided directory.

The container starting definition includes docker_image, ports, envs, and datadir and modeldir as asset. docker_image is the name of a Docker image. The name of the Docker image includes a user name, an image name, and a version. Incidentally, the image name may be the same as a catalog name. ports are port names used in communication. envs is an environment variable. datadir includes a data specification (path) and a mount path (mountdir) within the container in a case where a kind of data is learning data or the like. modeldir includes a data specification (path) and a mount path (mountdir) within the container in a case where a kind of data is a model such as a learning model.

As an example, in a case where a catalog ID is "001," there are "container1.yml" and "container2.yml" as container starting definitions. For example, two container starting definitions are set. In the case where a container starting definition is "container1.yml," "kuromt/app1:v1" is defined as docker_image (name of the Docker image). "kuromt" within docker_image is the user name. "app1" is the image name and the catalog name. "v1" is the version of the catalog. In datadir, "/train" is defined as mountdir, and "dataset" is defined as a path. For example, data of "dataset" is defined as being mounted in the mount directory "/train." In modeldir, "/model" is defined as mountdir, and "model" is defined as a path. For example, a learning model of "model" is defined as being mounted in the mount directory "/model."

Another example of the format of the catalog information 22 will also be described with reference to FIG. 4. FIG. 4 is a diagram illustrating another example of the format of the catalog information according to the embodiment. The catalog information 22 illustrated in FIG. 4 is expressed in a table format. A first row of the catalog information 22 illustrated in FIG. 4 is the same information as the contents of the catalog in the case where docker_image is "kuromt/app1:v1" as illustrated in FIG. 3.

As illustrated in FIG. 4, the catalog information 22 is information associating catalog_id, catalog_version, docker_image, port, Envs, and asset with each other. asset includes datadir and modeldir. datadir includes mountdir and path. modeldir includes mountdir and path. catalog_id corresponds to the catalog ID in FIG. 3. catalog_version is the version of the catalog, and is information corresponding to a Docker tag. docker_image corresponds to docker_image in FIG. 3. The version in docker_image corresponds to catalog_version described above. port corresponds to ports in FIG. 3. asset corresponds to asset in FIG. 3.

Returning to FIG. 2, the data operating unit 11 stores the data used by the application in the data storage space according to the definition of the interface of data operation.

The data storage space may, for example, be the container execution infrastructure or a separate distributed file system. In addition, the data operating unit 11 adds data information of the stored data to the data information 21. The data information, for example, includes a concrete data path of the data storage space for the stored data.

According to the definition of the interface of the catalog operation, the catalog operating unit 12 registers the definition information of a method of starting a container as a catalog in the catalog information 22, the definition information being obtained by adding information regarding the data used by the application to information regarding an image of an execution environment of the application. The information regarding the data, for example, includes a kind of data, a data specification (path), and a mount path within the container. The kind of data includes data such as learning data and a model such as a learning model.

According to the definition of the interface of the service operation, the service operating unit 13 refers to the catalog information 22, and starts a container corresponding to the catalog name and the version of the catalog. For example, when a user specifies the catalog name and the version of the catalog, the service operating unit 13 refers to the catalog information 22, and obtains the catalog corresponding to the catalog ID indicated by the specified catalog name and the version of the catalog. The service operating unit 13 refers to the data information 21, and obtains respective concrete data paths of the data storage space for the data and the model specified in the obtained catalog. The service operating unit 13 then requests Docker to start a container. A request to start the container includes the name of the Docker image included in the catalog, ports, an environment variable, data paths, mount paths within the container, and the concrete data paths of the data storage space.

The code management cooperating unit 14 is a functional unit that cooperates with the code managing tool managing the source code of the application when the tool is used. For example, the code management cooperating unit 14 requests the code managing tool to build the Docker image. When the code managing tool receives the request, the code managing tool builds the Docker image by using the source code of the application and the Docker file that are managed by the code managing tool itself. The code managing tool then registers the build Docker image in the registry (storage space of the Docker image). Incidentally, Gitlab, for example, is cited as the code managing tool. Gitlab is a platform of source code management using a Git command. Gitlab manages the source code of the application as a project. In addition, Gitlab has a concept of a branch for implementing another function using the code of the project and a concept of a tag for storing the code at a certain point in time. In addition, Gitlab has a function of building the Docker image by using the source code of the application and the Docker file that are present in the project, and registering the Docker image in the registry.

[One Example of Sequence of Catalog Operation]

FIG. 5 is a diagram illustrating an example of a sequence of a catalog operation according to the embodiment. Description will be made of a case where the code management cooperating unit 14 and the code managing tool are not used in FIG. 5. In addition, description will be made of a case where data is learning data and a model in FIG. 5. Incidentally, in FIG. 5, processing performed by the application developer is indicated by a broken line.

As illustrated in FIG. 5, the application developer (for example, the user name "kuromt") develops an application (app1) (S11). The application developer creates learning data accessed from the application (app1), and creates a model from the learning data (S12). The application developer then arequests the managing device 1 to register the created learning data and the created model (S13).

In the managing device 1, the data operating unit 11 registers each of the learning data and the model in the distributed file system 2 (S14 and S15). The data operating unit 11 then adds information regarding the registered data to the data information 21 (S16). For example, the data operating unit 11 adds a concrete data path of the registered learning data on the distributed file system 2 to the data information 21. The data operating unit 11 adds a concrete data path of the registered model on the distributed file system 2 to the data information 21.

Next, the application developer creates a Docker file (S17). The application developer builds a Docker image by using the created Docker file and the source code of the application (S18). The application developer then registers the Docker image in a Docker registry 3 (S19). The Docker image having "kuromt/app1:v1" as a Docker image name is registered in the Docker registry 3.

Next, the application developer requests the managing device 1 to register a catalog (S20). Suppose, for example, that the application developer having the user name "kuromt" transmits, to the managing device 1, a catalog registration request having, as parameters, "catalog_name=app1,version=v1,datadir={mountdir=/train, path=dataset},modeldir={mountdir=/model,path=model}." For example, "app1" as the catalog name (catalog_name) and "v1" as the version (version) are included in the parameters. As a data directory (datadir) of the learning data, "dataset" as a specification (path) of the learning data and "/train" as a mount path within the container are included in the parameters. In addition, as a model directory (modeldir) of the model, "model" as a specification (path) of the model and "/model" as a mount path (mountdir) within the container are included in the parameters. Incidentally, information of an environment variable and execution arguments such as ports may be added to the parameters.

In the managing device 1, when the catalog operating unit 12 receives the catalog registration request, the catalog operating unit 12 generates a catalog definition by using the parameters of the registration request, and registers the catalog definition (S21). For example, the catalog operating unit 12 sets, in the catalog, the name of the Docker image, the name being obtained from the user name requesting the registration and the catalog name and the version included in the parameters. The catalog operating unit 12 sets, in the catalog, the data directory of the learning data and the model directory of the model, the data directory and the model directory being included in the parameters. The catalog operating unit 12 then registers the catalog in the catalog information 22. Incidentally, in the case where the parameters include the information of the environment variable and the execution arguments such as the ports, the catalog operating unit 12 sets also these pieces of information in the catalog, and registers the catalog in the catalog information 22. For example, the catalog operating unit 12 registers the definition of a method of starting an app1:v1 container on which to mount the learning data for app1 and the model for app1 on the distributed file system 2 as a catalog in the catalog information 22.

[One Example of Sequence of Starting Service]

Figure 6B:
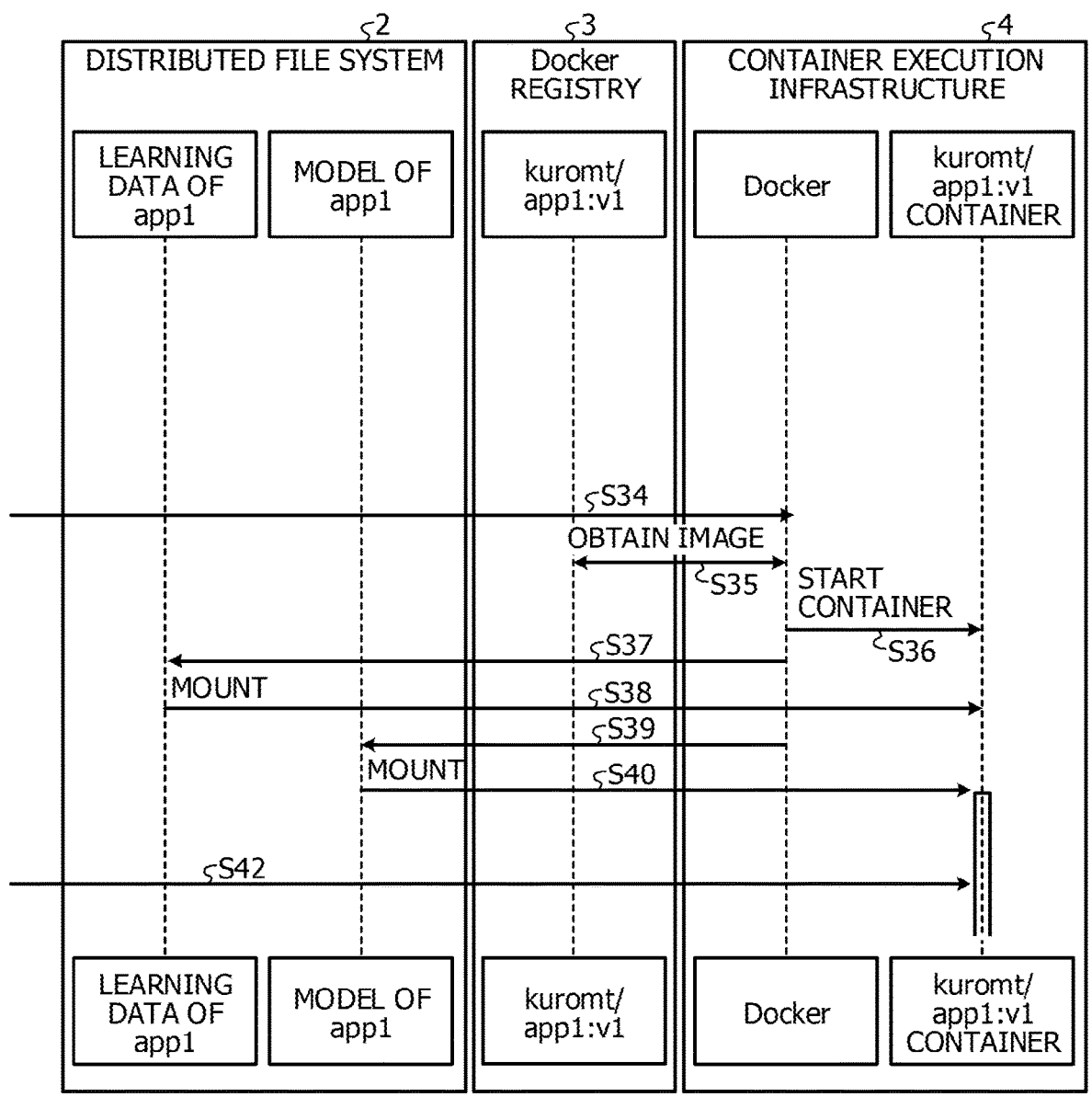

FIG. 6 (i.e., FIGS. 6A and 6B) is a diagram illustrating an example of a sequence of starting a service according to the embodiment. Description will be made of a case where data is learning data and a model in FIG. 6.

As illustrated in FIG. 6, when a user desires to use a service having a catalog name "app1" and a version "v1," the user requests a start-up of the service by specifying "app1" as a catalog name, "v1" as a version, and "myservice" as a service name (S31). For example, the user transmits a service start-up request having "catalog_name=app1,version=v1,name=myservice" as parameters to the managing device 1. Incidentally, it suffices for the service name to be arbitrarily specified by the user.

In the managing device 1, when the service operating unit 13 receives the service start-up request, the service operating unit 13 reads the catalog from the catalog information 22 by using the parameters of the start-up request (S32). For example, the service operating unit 13 refers to the catalog information 22, and reads the catalog corresponding to the catalog name "app1" and the version "v1."

The service operating unit 13 reads information of corresponding data from the data information 21 by using a specification of learning data and a specification of a model, the specifications being set in the catalog (S33). For example, the service operating unit 13 obtains "dataset" as the specification (path) of the learning data from the catalog. The service operating unit 13 obtains "model" as the specification (path) of the model from the catalog. The service operating unit 13 then refers to the data information 21, and obtains a concrete data path on the distributed file system 2, the concrete data path corresponding to "dataset" indicating the specification (path) of the learning data. The service operating unit 13 refers to the data information 21, and obtains a concrete data path on the distributed file system 2, the concrete data path corresponding to "model" indicating the specification (path) of the model.

The service operating unit 13 requests the container execution infrastructure 4 to start a container (S34). For example, the service operating unit 13 transmits a container starting request having, as parameters, the name of a Docker image included in the catalog, ports, an environment variable, the specifications (paths) of the learning data and the model, and mount paths within the container. The container starting request further includes the concrete data paths on the distributed file system 2, the concrete data paths corresponding to the specifications (paths) of the learning data and the model.

In the container execution infrastructure 4, when Docker receives the container starting request, Docker obtains the name of the Docker image from the parameters of the starting request. Docker then obtains the Docker image corresponding to the obtained name of the Docker image from the Docker registry (S35). In this case, Docker obtains the Docker image having "kuromt/app1:v1" as the Docker image name.

Docker starts the container by using the obtained Docker image (S36).

Next, Docker obtains the mount path within the container and the concrete data path on the distributed file system 2, the mount path and the concrete data path corresponding to the specification (path) of the learning data, from the parameters of the starting request. Docker obtains the learning data corresponding to the specification (path) of the learning data from the concrete data path on the distributed file system 2 (S37). Docker then mounts the obtained learning data in the mount path within the container (S38).

Similarly, Docker obtains the mount path within the container and the concrete data path on the distributed file system 2, the mount path and the concrete data path corresponding to the specification (path) of the model, from the parameters of the starting request. Docker obtains model data corresponding to the specification (path) of the model from the concrete data path on the distributed file system 2 (S39). Docker then mounts the obtained model data in the mount path within the container (S40).

In the managing device 1, when the service operating unit 13 receives completion of the starting of the container from Docker, the service operating unit 13 notifies completion of the start-up of the service to the user (S41).

When the user obtains the completion of the start-up of the service, the user uses various functions from the started container through a Web API, for example (S42).

Thus, even when the user uses data having a large data size such as the learning data on the container, the data stored in the external storage is mounted when the container is started, and therefore the large-scale data does not have to be embedded in the Docker image. For example, the user can start the container without concern about a limitation on the data amount of data embedded in the container. In addition, the user can use the application on the container without being aware of the combination of the data storage locations and the Docker image to be used.

[Another Example of Sequence of Catalog Operation]

Figure 7A:
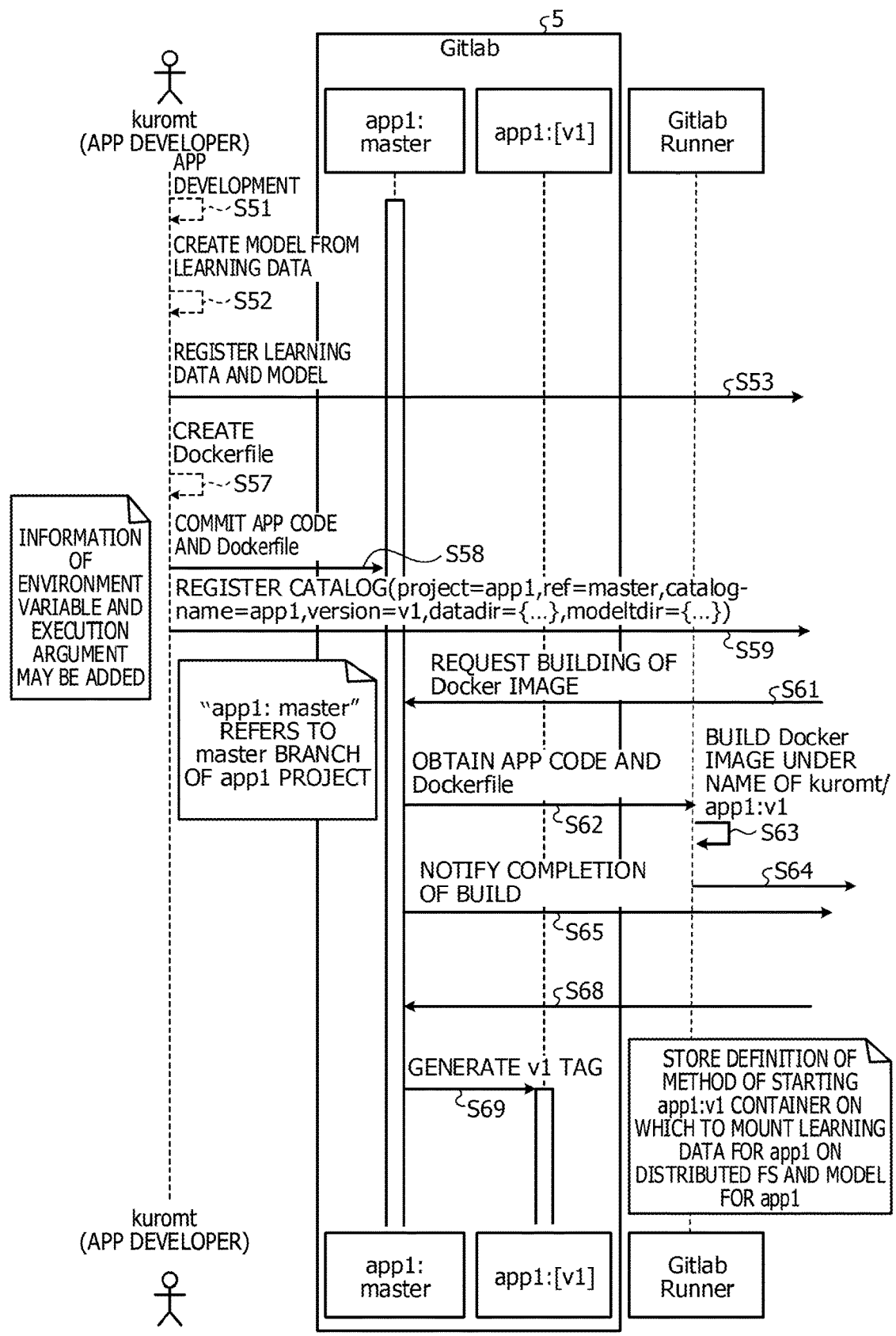
FIGS. 7A and 7B and 7C are a diagram illustrating another example of the sequence of the catalog operation according to the embodiment.
Figure 7B:
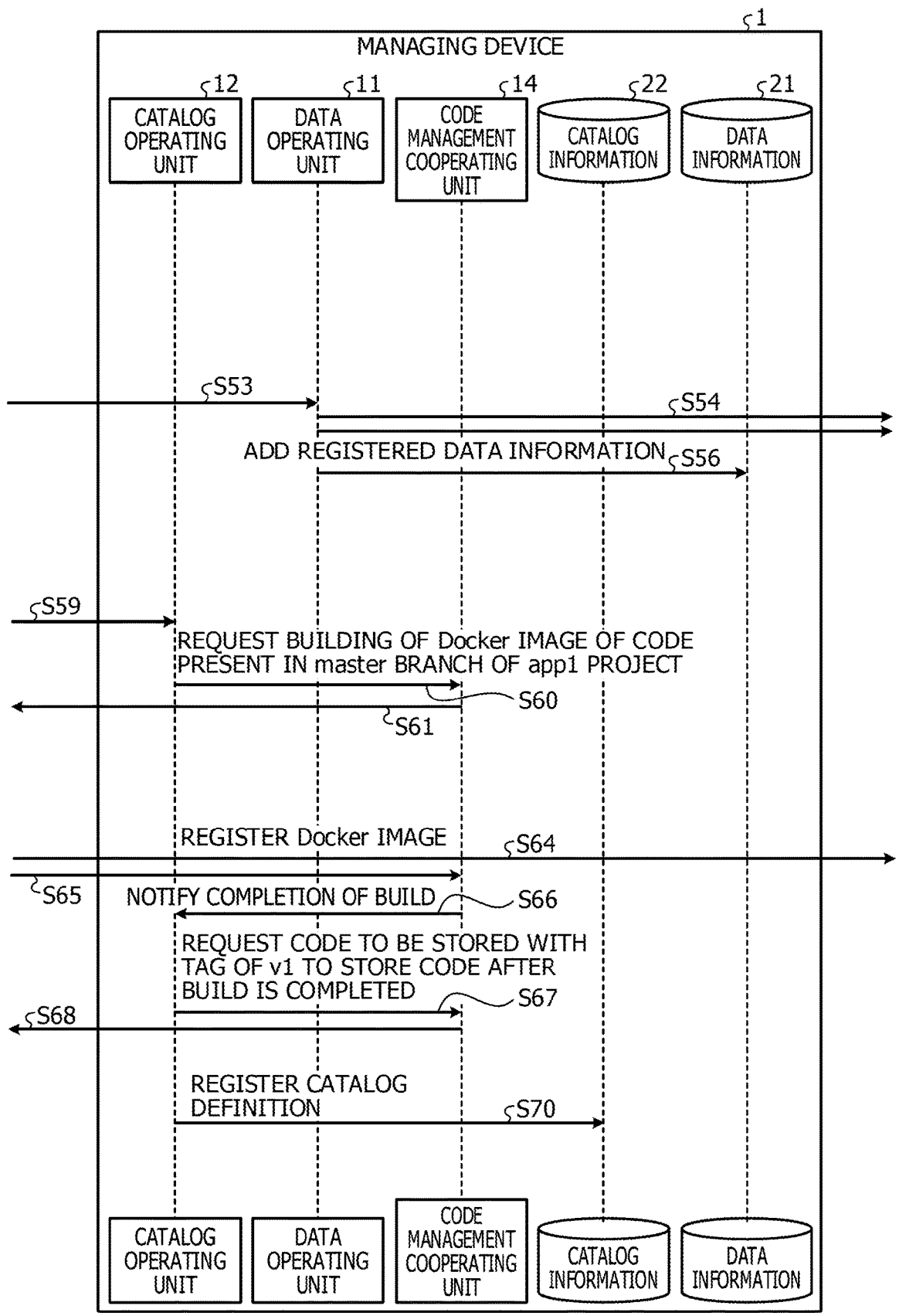
Figure 7C:
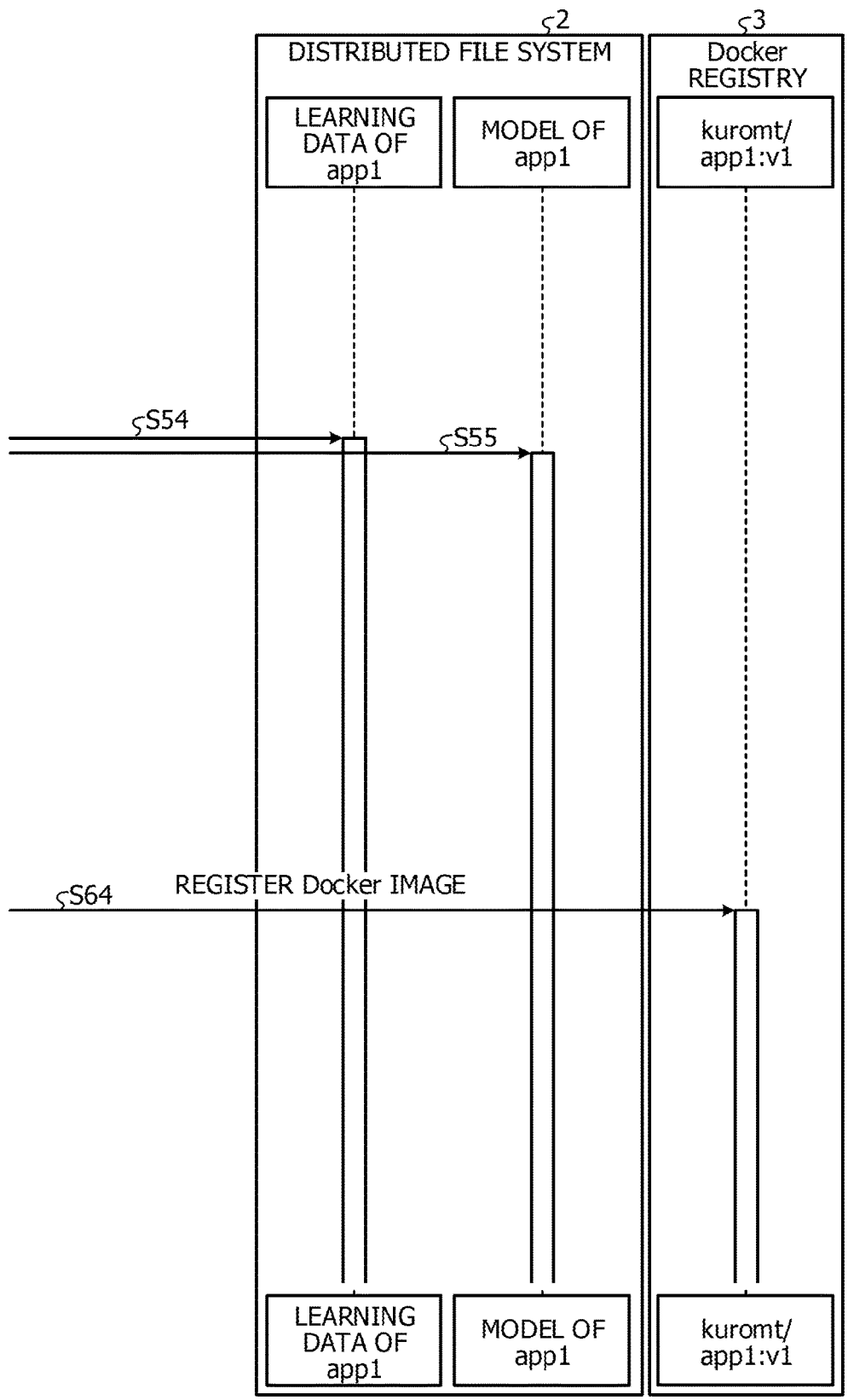

FIG. 7 (i.e., FIGS. 7A and 7B and 7C) is a diagram illustrating another example of the sequence of the catalog operation according to the embodiment. Description will be made of a case where the code management cooperating unit 14 and the code managing tool are used in FIG. 7. In addition, description will be made of a case where data is learning data and a model in FIG. 7. Incidentally, in FIG. 7, processing performed by the application developer is indicated by a broken line.

As illustrated in FIG. 7, the application developer (for example, the user name "kuromt") develops an application (app1) (S51). The application developer creates learning data accessed from the application (app1), and creates a model from the learning data (S52). The application developer then requests the managing device 1 to register the created learning data and the created model (S53).

In the managing device 1, the data operating unit 11 registers each of the learning data and the model in the distributed file system 2 (S54 and S55). The data operating unit 11 then adds information regarding the registered data to the data information 21 (S56). For example, the data operating unit 11 adds a concrete data path of the registered learning data on the distributed file system 2 to the data information 21. The data operating unit 11 adds a concrete data path of the registered model on the distributed file system 2 to the data information 21.

Next, the application developer creates a Docker file (S57). The application developer commits the created Docker file and the source code of the application to Gitlab (S58). Suppose, for example, that the application developer commits the created Docker file and the source code of the application to a master branch of an app1 project of Gitlab.

Then, the application developer requests the managing device 1 to register a catalog (S59). Suppose, for example, that the application developer having the user name "kuromt" transmits, to the managing device 1, a catalog registration request having "project=app1,ref=master, catalog_name=app1,version=v1,datadir={mountdir=/train, path=dataset},modeldir={mountdir=/model, path=model}" as parameters. For example, "app1" as a project (project) name on Gitlab 5 and "master" as a branch (ref) name are included in the parameters. Then, "app1" as a catalog name (catalog_name) and "v1" as a version (version) are included in the parameters. As a data directory (datadir) of the learning data, "dataset" as a specification (path) of the learning data and "/train" as a mount path within the container are included in the parameters. Then, as a model directory (modeldir) of the model, "model" as a specification (path) of the model and "/model" as a mount path (mountdir) within the container are included in the parameters. Incidentally, information of an environment variable and execution arguments such as ports may be added to the parameters.

In the managing device 1, when the catalog operating unit 12 receives the catalog registration request, the catalog operating unit 12 obtains the project and the branch where the code to be used to build a Docker image is present from the parameters of the registration request. The catalog operating unit 12 requests Gitlab 5 to build the Docker image of the code present in the master branch of the app1 project by making the code management cooperating unit 14 cooperate (S60 and S61).

When Gitlab 5 receives a request to build the Docker image, a Gitlab Runner obtains the Docker file and the source code of the application that are present in the master branch of the app1 project (S62). The Gitlab Runner builds the Docker image by using the obtained Docker file and the obtained source code of the application (S63). The Gitlab Runner then registers the Docker image in the Docker registry 3 (S64). The Docker image having "kuromt/app1: v1" as a Docker image name is registered in the Docker registry 3. Gitlab 5 then notifies completion of the build of the Docker image to the catalog operating unit 12 by making the code management cooperating unit 14 cooperate (S65 and S66).

In the managing device 1, in order to store the code after the build is completed, the catalog operating unit 12 requests Gitlab 5 to store the code with a tag of v1 by making the code management cooperating unit 14 cooperate (S67 and S68).

When Gitlab 5 receives a request to store the code with the tag of v1, Gitlab 5 generates the tag of v1, and stores, with the tag of v1, the Docker file and the source code of the application that are present in the master branch of the app1 project (S69).

Next, in the managing device 1, the catalog operating unit 12 generates a catalog definition by using the parameters of the registration request from the application developer, and registers the catalog definition (S70). For example, the catalog operating unit 12 sets, in the catalog, the name of the Docker image, the name being obtained from the user name requesting the registration and the catalog name and the version included in the parameters. The catalog operating unit 12 sets, in the catalog, the data directory of the learning data and the model directory of the model, the data directory and the model directory being included in the parameters. The catalog operating unit 12 then registers the catalog in the catalog information 22. Incidentally, in the case where the parameters include the information of the environment variable and the execution arguments such as the ports, the catalog operating unit 12 sets also these pieces of information in the catalog, and registers the catalog in the catalog information 22. For example, the catalog operating unit 12 registers the definition of a method of starting an app1:v1 container on which to mount the learning data for app1 and the model for app1 on the distributed file system 2 as a catalog in the catalog information 22.

[Use of Managing Device]

Figure 8:
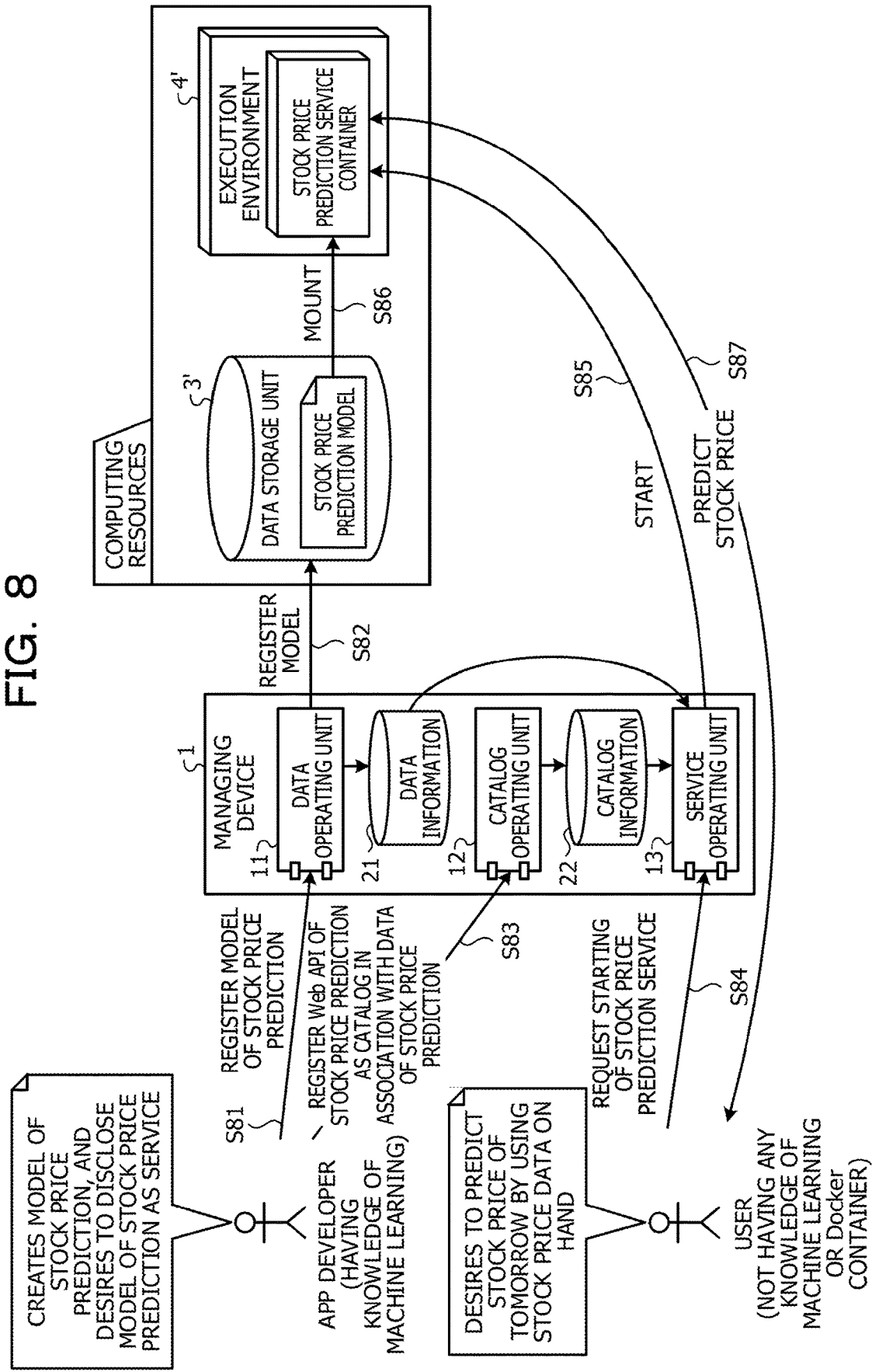
FIG. 8 is a diagram illustrating an example of a use of a managing device according to the embodiment.

FIG. 8 is a diagram illustrating an example of a use of a managing device according to the embodiment. Description will be made of a case where the managing device is used for stock price prediction in FIG. 8.

As illustrated in FIG. 8, an application developer having a knowledge of machine learning creates a model of stock price prediction, and discloses the model as a service. Then, the application developer requests the managing device 1 to register the model of stock price prediction (S81). Then, the data operating unit 11 of the managing device 1 registers, in a data storage unit 3', the model of stock price prediction, the model being requested to be registered (S82). In addition, the data operating unit 11 adds a concrete data path of the registered model on the data storage unit 3' to the data information 21.

Then, the application developer requests the managing device 1 to register, as a catalog, information associating a Web API (appx) of stock price prediction with data (xxx) of the model of stock price prediction (S83). For example, the application developer having "kuromt" as a user name transmits a catalog registration request having "catalog_name=appx,version=v1,modeldir={mountdir=/model,path=xxx}" as parameters to the managing device 1.

Then, the catalog operating unit 12 of the managing device 1 generates a catalog definition by using the parameters of the registration request, and registers the catalog definition in the catalog information 22.

Here, suppose that a user not having any knowledge of machine learning and Docker containers desires to predict a stock price of tomorrow by using stock price data on hand. Then, the user specifies the name of the catalog desired to be used and the version, and requests a start of the service of stock price prediction (S84). For example, when the user uses the service having "appx" as a catalog name and "v1" as a version, the user transmits a service starting request having "appx" as a catalog name, "v1" as a version, and "sss" as a service name to the managing device 1.

Then, the service operating unit 13 of the managing device 1 refers to the catalog information 22, and reads the catalog corresponding to the catalog name "appx" and the version "v1." The service operating unit 13 reads the concrete data path of the corresponding model on the data storage unit 3' from the data information 21 by using the specification (path) of the model, the specification (path) being set in the catalog. The service operating unit 13 then transmits a container starting request having the contents of the catalog and the concrete data path of the model as parameters to an execution environment 4' (S85).

In the execution environment 4', Docker starts a container of the stock price prediction service by using a Docker image of stock price prediction. Docker then obtains the mount path within the container and the concrete data path on the data storage unit 3', the mount path and the concrete data path corresponding to the specification (path) of the model, from the parameters of the starting request. Then, Docker obtains the stock price prediction model from the obtained data path, and mounts the obtained model in the mount path within the container (S86).

Then, the user predicts the stock price of tomorrow by using the stock price prediction service that operates on the container started in the execution environment 4' (S87).

Thus, the user not having any detailed knowledge of machine learning can start up the service for performing machine learning for the user himself/herself by using the data of the developer without knowing the method of starting the container prepared by the developer. In addition, even when the user operates the service involving a large data size on the container, data stored in the external storage is mounted when the container is started, and therefore the large-scale data does not have to be embedded in the Docker image. For example, the user can start the container without concern about a limitation on the amount of data embedded in the container. In addition, the user can use the service operating on the container without being aware of the combination of the data storage locations and the Docker image to be used.

[Effects of Embodiment]

According to the embodiment, the managing device 1 stores data used by an application according to a definition of an interface of data operation when defining a method of starting a container representing a region in which an execution environment of the application is disposed. The managing device 1 stores an image of the execution environment of the application. According to a definition of an interface of container operation, the managing device 1 registers, in the catalog information 22, the method of starting the container such that data information regarding the data used by the application in the container is added to information regarding the image of the execution environment of the application. According to such a configuration, the managing device 1 registers the method of starting the container, and therefore the user can use the application on the container without being aware of a combination of a data storage location and the image of the execution environment of the application to be used.

In addition, the catalog information 22 is information including a name of the image of the execution environment of the application, a version of the image, a position in which the data is stored, and a position in which to mount the data. According to such a configuration, the managing device 1 registers the method of starting the container as a catalog. Thus, the user can use the application without being aware of a combination of a storage location of the data desired to be used and the image of the execution environment of the application to be used.

In addition, the managing device 1 refers to the catalog information 22 and starts the container corresponding to identification information of the catalog as the method of starting the container and a version of the catalog according to a definition of an interface of service operation. According to such a configuration, the managing device 1 starts the corresponding container by using the identification information of the catalog and the version of the catalog. Thus, the user can use the application without being aware of the combination of the storage location of the data desired to be used and the image of the execution environment of the application to be used.

In addition, according to the definition of the interface of the container operation performed by the application developer, the managing device 1 registers the catalog corresponding to the container operation in the catalog information 22. The managing device 1 starts the container according to the definition of the interface of the service operation performed by the user. According to such a configuration, the user can easily reproduce the environment in which the application is used.

[Others]

Incidentally, in the foregoing embodiment, description has been made of a case where the user transmits a service start-up request having a catalog name and a version of a catalog as parameters to the managing device 1. Then, in the managing device 1, the service operating unit 13 requests Docker to start up a container by using the catalog corresponding to the specified catalog name and the specified version of the catalog. However, the user is not limited to this, but may transmit, to the managing device 1, a service start-up request having, as parameters, the catalog name and the version of the catalog and also information regarding own data of the user. For example, the user transmits a service start-up request having "catalog_name=app1, version=v1,name=myservice,datadir={mountdir=/yyy, path=datayyy}" as parameters to the managing device 1. Here, the information regarding the own data is specified in datadir. For example, "/yyy" as mountdir and "datayyy" as a path are specified in datadir. For example, mounting of the data of "datayyy" in a mount directory "/yyy" on the container is specified. Incidentally, it suffices for the service name (name) to be arbitrarily specified by the user.

In addition, the managing device 1 according to the foregoing embodiment may be implemented by incorporating various functions of the control unit 10 and the storage unit 20 described above or the like in a known information processing device such as a personal computer or a workstation.

In addition, in the foregoing embodiment, each constituent element of the device illustrated in the figures does not necessarily need to be physically configured as illustrated in the figures. For example, concrete modes of distribution and integration of the device are not limited to those illustrated in the figures, but the whole or a part of the device may be configured so as to be distributed and integrated functionally or physically in arbitrary units according to various kinds of loads, usage conditions, or the like. For example, the data operating unit 11 and the catalog operating unit 12 may be integrated with each other. The catalog operating unit 12 may be distributed into a catalog operating unit in a case where the code management cooperating unit 14 is used and a catalog operating unit in a case where the code management cooperating unit 14 is not used. The storage unit 20 may be coupled as an external device of the managing device 1 via a network.

Figure 9:
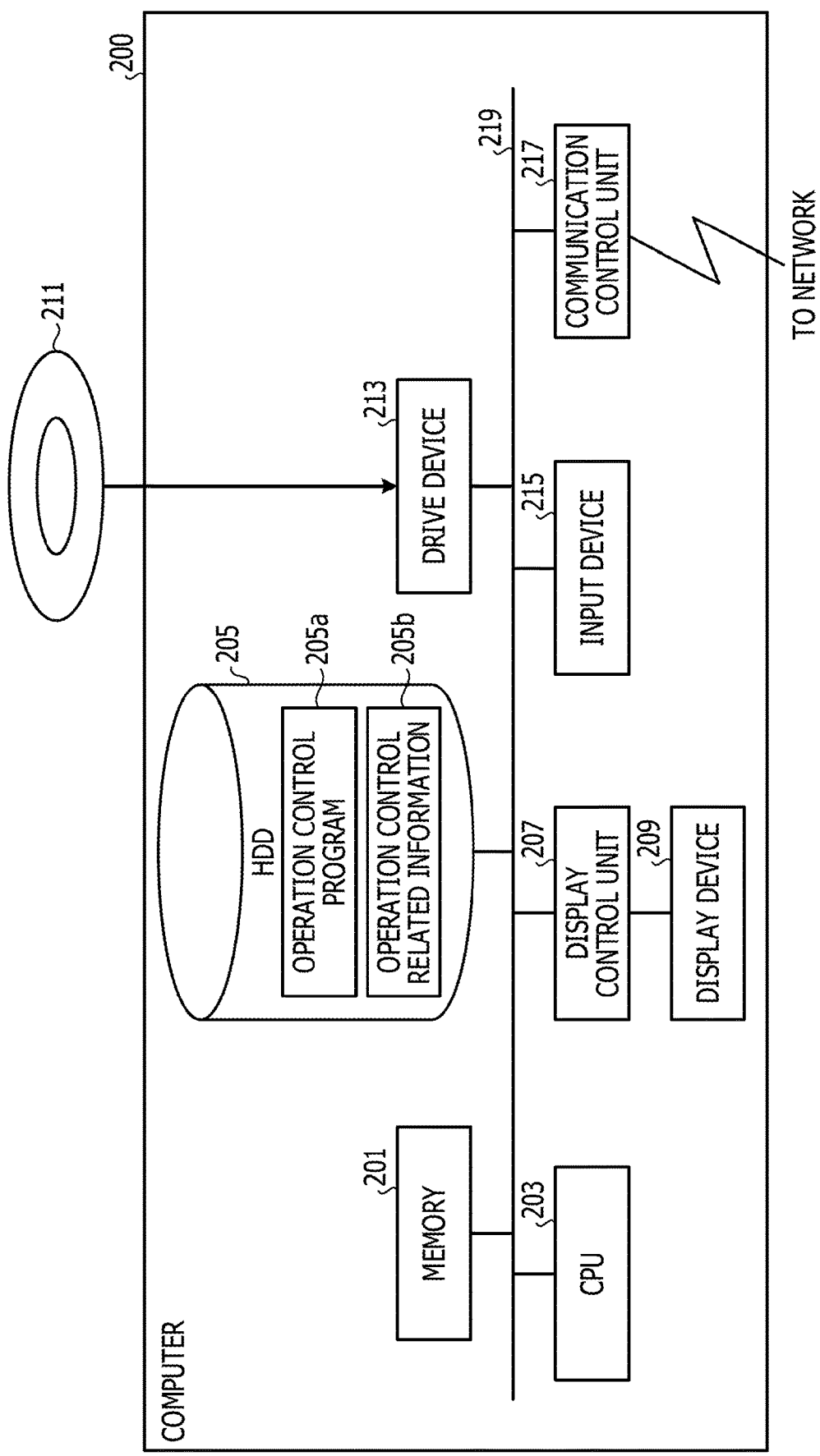
FIG. 9 is a diagram illustrating an example of a computer that executes an operation control program.
Figure 10:
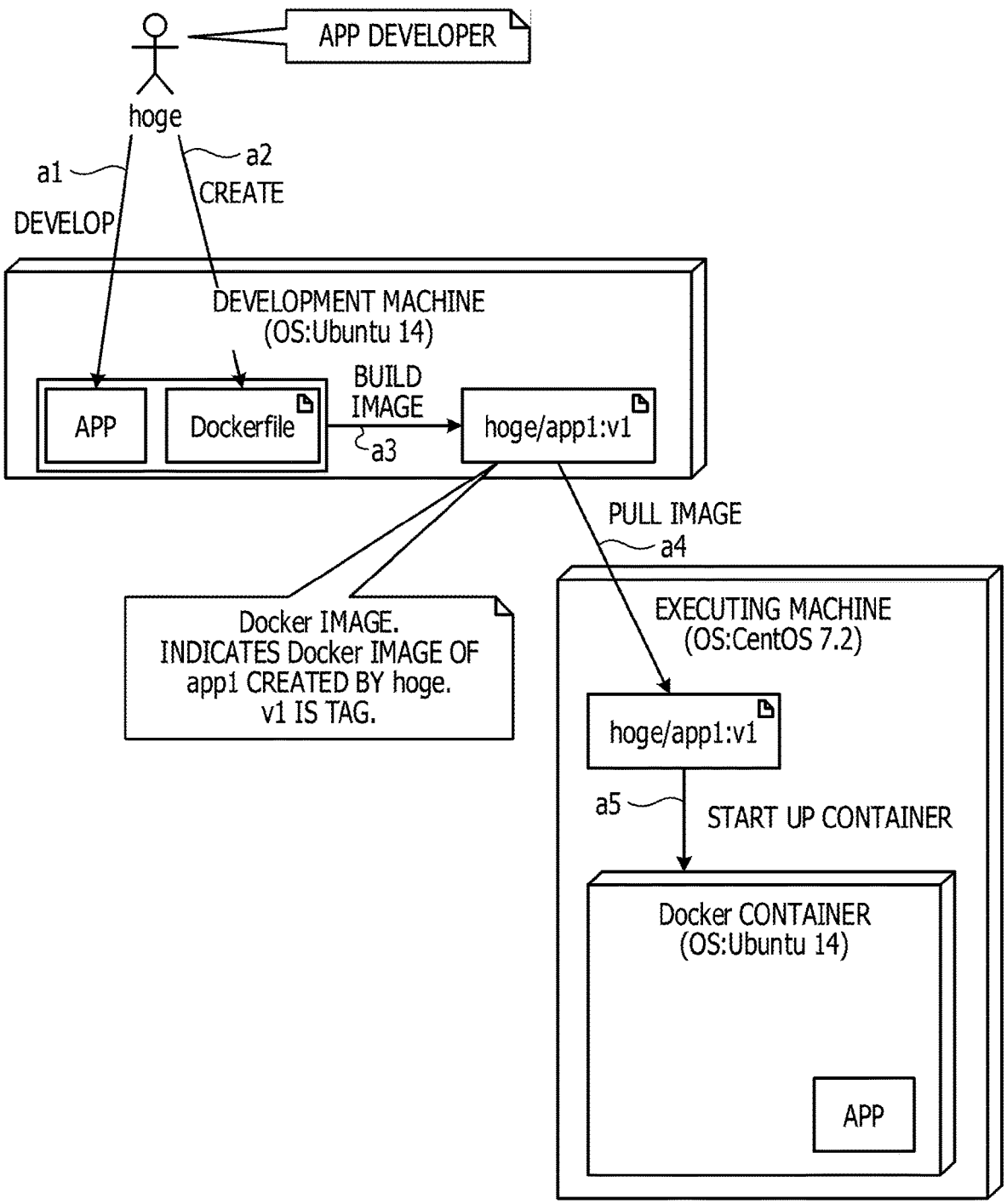
FIG. 10 is a reference diagram illustrating an example of usage of Docker.

In addition, various kinds of processing described in the foregoing embodiment may be implemented by executing a program prepared in advance in a computer such as a personal computer or a workstation. Accordingly, in the following, description will be made of an example of a computer that executes a program implementing functions similar to those of the managing device 1 illustrated in FIG. 2. FIG. 9 is a diagram illustrating an example of a computer that executes an operation control program.

As illustrated in FIG. 9, a computer 200 includes a CPU 203 that performs various kinds of arithmetic processing, an input device 215 that receives input of data from a user, and a display control unit 207 that controls a display device 209. The computer 200 also includes a drive device 213 that reads a program or the like from a storage medium and a communication control unit 217 that sends and receives data to and from another computer via a network. The computer 200 also includes a memory 201 that temporarily stores various kinds of information and a hard disk drive (HDD) 205. The memory 201, the CPU 203, the HDD 205, the display control unit 207, the drive device 213, the input device 215, and the communication control unit 217 are coupled to each other by a bus 219.

The drive device 213 is, for example, a device for a removable disk 211. The HDD 205 stores an operation control program 205a and operation control related information 205b.

The CPU 203 reads the operation control program 205a, expands the operation control program 205a into the memory 201, and executes the operation control program 205a as a process. Such a process corresponds to each functional unit of the managing device 1. The operation control related information 205b corresponds to the data information 21 and the catalog information 22. The removable disk 211, for example, stores various pieces of information such as the operation control program 205*a* and the like.

Incidentally, the operation control program 205*a* does not necessarily need to be stored on the HDD 205 from the beginning. For example, the program is stored on a "portable physical medium" such as a flexible disk (FD), a compact disk read only memory (CD-ROM), a digital versatile disk (DVD), a magneto-optical disk or an integrated circuit (IC) card that is inserted into the computer 200. Then, the computer 200 may read and execute the operation control program 205*a* from these media.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. An operation control method comprising:
    storing data used by an application according to a first definition with respect to an interface of data operation when defining a way of starting a container, the container representing a region in which an execution environment of the application is disposed;
    storing an image file for the execution environment of the application; and
    registering a second definition into definition information, the second definition indicating the way of starting the container and being obtained by adding data information to information regarding the image file for the execution environment of the application in accordance with a third definition with respect to an interface of container operation, the data information being information regarding data used by the application in the container.

2. The operation control method according to claim 1, wherein
    the definition information includes a name of the image file for the execution environment of the application, a version of the image file, a position in which the data is stored, and a position in which to mount the data.

3. The operation control method according to claim 2, further comprising:
    referring to the definition information in accordance with a fourth definition with respect to an interface of service operation, and
    starting a first container in accordance with the referred definition information, the first container being a container identified by information regarding the second definition indicated by the referred definition information.

4. The operation control method according to claim 3, wherein the information regarding the second definition includes identification information of the second definition and a version of the second definition.

5. The operation control method according to claim 3, wherein
    the container operation associated with the third operation is an operation for an application developer,
    the service operation associated with the fourth definition is an operation for a user of the application.

6. An apparatus for operation control, the apparatus comprising:
    a memory; and
    a processor coupled to the memory, the processor being configured to
        execute a process that includes storing data used by an application according to a first definition with respect to an interface of data operation when defining a way of starting a container, the container representing a region in which an execution environment of the application is disposed,
        execute a process that includes storing an image file for the execution environment of the application, and
        execute a process that includes registering a second definition into definition information, the second definition indicating the way of starting the container and being obtained by adding data information to information regarding the image file for the execution environment of the application in accordance with a third definition with respect to an interface of container operation, the data information being information regarding data used by the application in the container.

7. The apparatus according to claim 6, wherein
    the definition information includes a name of the image file for the execution environment of the application, a version of the image file, a position in which the data is stored, and a position in which to mount the data.

8. The apparatus according to claim 7, wherein
    the processor is further configured to
        execute a process that includes referring to the definition information in accordance with a fourth definition with respect to an interface of service operation, and
        execute a process that includes starting a first container in accordance with the referred definition information, the first container being a container identified by information regarding the second definition indicated by the referred definition information.

9. The apparatus according to claim 8, wherein the information regarding the second definition includes identification information of the second definition and a version of the second definition.

10. The apparatus according to claim 8, wherein
    the container operation associated with the third operation is an operation for an application developer,
    the service operation associated with the fourth definition is an operation for a user of the application.

11. A non-transitory computer-readable storage medium for storing a program which causes a processor to perform processing for operation control, the processing comprising:
    storing data used by an application according to a first definition with respect to an interface of data operation when defining a way of starting a container, the container representing a region in which an execution environment of the application is disposed;
    storing an image file for the execution environment of the application; and
    registering a second definition into definition information, the second definition indicating the way of starting the container and being obtained by adding data information to information regarding the image file for the execution environment of the application in accordance with a third definition with respect to an interface of container operation, the data information being information regarding data used by the application in the container.

12. The non-transitory computer-readable storage medium according to claim 11, wherein
the definition information includes a name of the image file for the execution environment of the application, a version of the image file, a position in which the data is stored, and a position in which to mount the data.

13. The non-transitory computer-readable storage medium according to claim 12, the processing further comprises:
referring to the definition information in accordance with a fourth definition with respect to an interface of service operation, and
starting a first container in accordance with the referred definition information, the first container being a container identified by information regarding the second definition indicated by the referred definition information.

14. The non-transitory computer-readable storage medium according to claim 13, wherein the information regarding the second definition includes identification information of the second definition and a version of the second definition.

15. The non-transitory computer-readable storage medium according to claim 13, wherein
the container operation associated with the third operation is an operation for an application developer,
the service operation associated with the fourth definition is an operation for a user of the application.

* * * * *